United States Patent [19]
McGough

[11] Patent Number: 5,134,654
[45] Date of Patent: Jul. 28, 1992

[54] HIGH SECURITY UPPER HOUSING SHIELD FOR TELEPHONE PAYSTATION

[75] Inventor: Gerald B. McGough, Huntsville, Ala.

[73] Assignee: Quadrum Telecommunications, Inc., Arab, Ala.

[21] Appl. No.: 640,892

[22] Filed: Jan. 14, 1991

[51] Int. Cl.$^5$ .............................................. H04M 1/00
[52] U.S. Cl. ..................................... 379/428; 379/419; 379/441; 379/451
[58] Field of Search ............... 379/143, 145, 155, 419, 379/428, 437, 440, 451

[56] References Cited

U.S. PATENT DOCUMENTS

| | | | |
|---|---|---|---|
| 4,037,067 | 7/1977 | Solomovitz | 379/451 |
| 4,267,411 | 5/1981 | Raines | 379/451 |
| 4,555,600 | 11/1985 | Morse | 379/451 |
| 4,942,748 | 7/1990 | McGough | 379/451 |
| 4,974,257 | 11/1990 | Ibanez et al. | 379/143 |

OTHER PUBLICATIONS

Hamilton, "A Single-Slot Coin Telephone", GTE Automatic Electric Technical Journal, vol. 13,#1, Jan. 1972.

Gorlitz, and Ludwig, "Siemens Interset 200- The New Coinbox Telephone", Telefon report, 1976 #1.

Nyffenegger, "The New CoinBox Set AZ44", Hasler Review, vol.9, #2, 1976.

R-TEC Systems, "Maximum Security", Telephony Jan. 19, 1987.

Primary Examiner—James L. Dwyer
Assistant Examiner—William Cumming
Attorney, Agent, or Firm—Robert J. Black

[57] ABSTRACT

A high security shield for use on the upper housing of conventional telephone paystations consisting of a thick stainless steel or similar material U-shaped wrap-around welded to the standard upper housing. The unit replaces the standard die cast face plate and contains the usual face plate features to provide maximum high security. The shield covers the entire front of the upper housing as well as each of the sides.

17 Claims, 1 Drawing Sheet

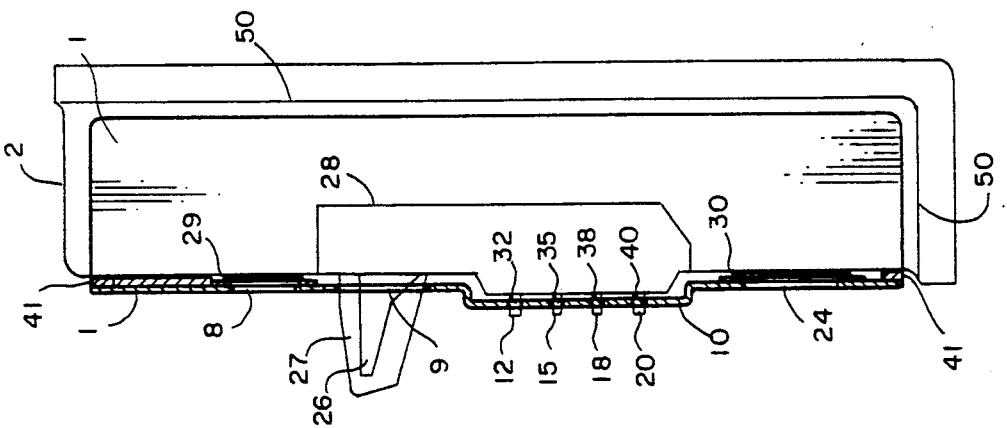
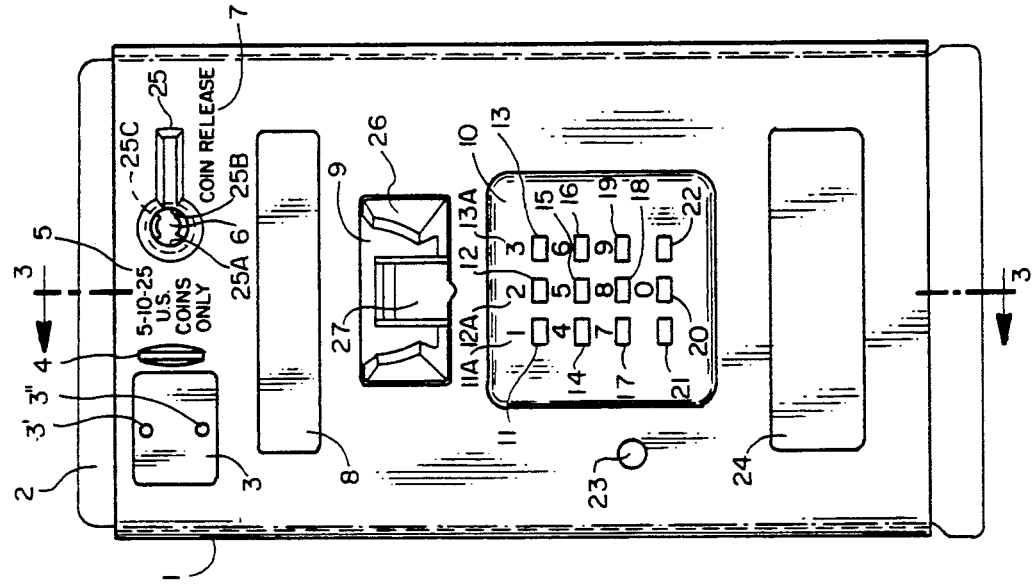
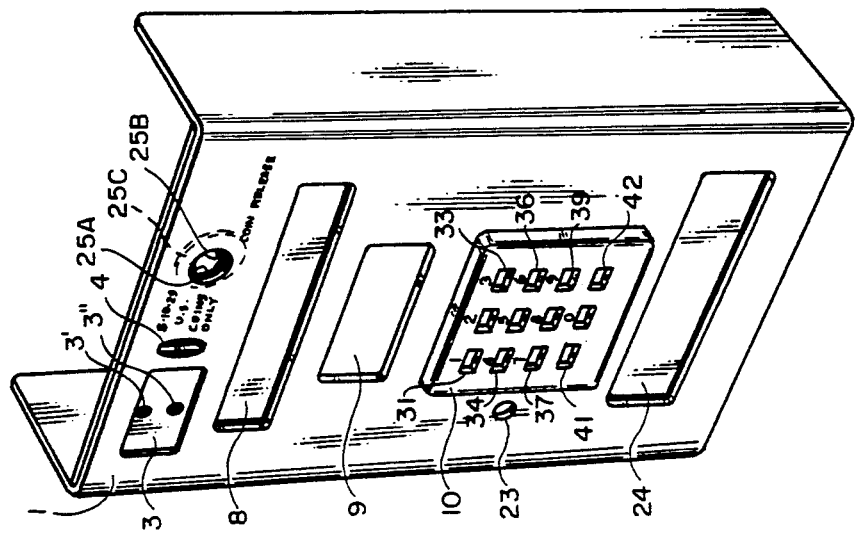

5,134,654

HIGH SECURITY UPPER HOUSING SHIELD FOR TELEPHONE PAYSTATION

BACKGROUND OF THE INVENTION

1. Field of the Invention

The present invention relates to telephone paystations, and more particularly to a shield for addition to the upper housing of conventional paystations that provides substantial protection from vandalism and burglaries.

2. Background Art

Armored housings, both upper and lower, to protect telephone paystations began to appear a few years ago in certain metropolitan areas where vandalism and burglary were frequently found. Such armored housings typically included the use of welded steel plates added to the outside of conventional housings and bolted on plates to the inside of standard paystation upper housings. Such arrangements were made to strengthen the unit and generally provide greater security. In many instances, special plates were welded on to protect the keypad (pushbutton calling device) area. However, in existing face plates, even after modification, conventional instruction windows, graphics, keypads, etc., were utilized and thus were still subject to substantial vandalism. Many telephone companies developed their own protective facilities for paystation housing.

While paystations so equipped were rather imposing in appearance, these arrangements did not actually offer a great deal of protection commensurate with the substantial additional cost involved therein. In such arrangements there is an extra layer of metal to go through. Once this is accomplished there becomes open space to and around the lock assembly which is the preferred access usually utilized by professional burglars. To provide the necessary protection at this point, however, a lock protector was developed and is disclosed in U.S. Pat. No. 4,852,373 assigned to the same assignee as the present application.

True protection, however, is a subjective thing, particularly when viewed from the telephone operating company's viewpoint. The lock protector, although effective, offers no outside imposing evidence of its presence, thus it is not the total solution for many telephone companies. Accordingly, it is the object of the present invention to provide a new and improved high security shield for the upper housing of the telephone paystation which provides an impressive appearance, therefore suggesting to potential thieves or vandals that the unit is protected from their activities.

SUMMARY OF THE INVENTION

The present invention is a large welded on stainless steel or similar material U-shaped wrap-around shield that lays over the bulk of the entire upper housing of a telephone paystation. The unit as designed eliminates the need for and replaces standard face plates and face plate features. Certain features, such as the information card windows and keypad button openings have been reduced to minimal size to increase security. Normal face plates will be engraved and then "inked" into the surface of the protective shield. The keypad area is raised to allow pushbuttons for the calling device to be fully protected when depressed so that their forward motion or travel goes beyond the depth of the protective shield.

BRIEF DESCRIPTION OF THE DRAWINGS

FIG. 1 is a perspective view of a high security shield in accordance with the present invention.

FIG. 2 is a front view of a high security shield in accordance with the present invention superimposed on the upper housing of a conventional telephone paystation.

FIG. 3 is a partial sectional view of a conventional telephone paystation taken along lines 3—3 of FIG. 2 with a high security shield in accordance with the present invention positioned thereon.

DESCRIPTION OF THE PREFERRED EMBODIMENT

Referring to FIGS. 1, 2 and 3, the present invention is a stainless steel plate formed into a "U" shape so as wrap around existing upper housings of conventional telephone paystations. The unit is intended to be arc welded along the edge of the upper housing in locations designated as 50 as may be seen on FIG. 3.

Punched or machined into the wrap-around shield shall be opening for the lock (not shown) in one of the side panels, and in the front panel for a handset cord (opening 23), coin slot 4, coin instruction plate 3, coin release mechanism opening 6, upper instruction window 8, hookswitch and handset cradle opening 9, and lower instruction window 24.

The central portion of the front panel is a raised portion 10 which goes over the touch calling device as may be seen in FIGS. 1, 2, and 3, including openings for each of the pushbuttons numbered 11, 12, 13, 14, 15, 16, 17, 18, 19, 20, 21, and 22. Respective openings which may be seen in FIGS. 1 or 3 are numbered 31 through 42, respectively. The depth of the openings and thickness of the front panel are such that when pushbuttons such as 11 through 22, respectively, are depressed, travel will be such that they depress to enter entirely within their associated opening.

Specific graphics are shown at 5, 7, and on that portion 10 of the face plate of the front panel located over the pushbutton calling device and designated as 11A through 20A, respectively, i.e., numbers 1 through 0. Such graphics, as well as others that may be required after engraving, will then be filled or inked with paint or similar material to provide a high visibility indication of the information to be conveyed to the telephone user. Also included behind the face plate is a washer 25C with areas 25A and 25B which facilitate but limit the movement of coin release lever 25 as may be seen by reference to FIG. 1. It may be seen in FIG. 3, the instructional information units 29 and 30 are located just behind openings 8 and 24, respectively. The coin information plate 3 is secured through the shield, however, it is not shown in the sectional drawing FIG. 3.

With some paystations, additional spacer plates may be required, such as 41 and 42, or these may be a combined single unit. Such spacers would be required where proper spacing is required between the shield and the front upper housing.

Referring now to the sectional drawing of FIG. 3, the hookswitch, cradle, and pushbutton unit 28 is shown in position with hookswitch 26 and cradle 27 projecting through opening 9 and pushbuttons, such as 32, 35, 38, and 40, projecting through openings 12, 15, 18, and 20, respectively.

While but a single embodiment of the present invention has been shown it will be obvious to those skilled in the art that numerous modifications may be made without departing from the spirit of the present invention which shall be limited only by the scope of the claims appended hereto.

What is claimed is:

1. A generally U-shaped high security shield for installation on the upper housing of a telephone paystation of conventional construction, said shield comprising:
   a vertically disposed face plate having a pair of integral vertically disposed side plates extending rearwardly from opposite edges thereof;
   said face plate adapted to be positioned adjacent a front side of said upper housing;
   said face plate including a raised portion adapted to be positioned over a pushbutton calling device included in said paystation upper housing;
   said raised portion including a plurality of openings adapted for positioning around the pushbuttons of said calling device;
   said side plates adapted to be positioned snuggly against opposed sides of said upper housing;
   said plates adapted to be secured to said upper housing.

2. A high security shield as claimed in claim 1 wherein:
   said plates are secured to said upper housing by welding.

3. A high security shield as claimed in claim 1 wherein:
   said shield is constructed of stainless steel.

4. A high security shield as claimed in claim 1 wherein:
   said face plate includes a plurality of graphic symbols on an exterior surface of said face plate.

5. A high security shield as claimed in claim 4 wherein:
   said graphics are engraved into said exterior surface of said face plate.

6. A high security shield as claimed in claim 5 wherein:
   said engraved graphics are filled with a colored material to increase the visibility thereof.

7. A high security shield as claimed in claim 1 wherein:
   there is further included a coin information plate secured to an exterior surface of said shield.

8. A high security shield as claimed in claim 1 wherein:
   said face plate includes a plurality of openings.

9. A high security shield as claimed in claim 8 wherein:
   there is further included an upper housing information instruction opening.

10. A high security shield as claimed in claim 8 wherein:
    there is further included a lower housing information instruction opening.

11. A high security shield as claimed in claim 8 wherein:
    there is further included an opening for a handset cord to be extended therethrough.

12. A high security shield as claimed in claim 8 wherein:
    there is further included a coin slot opening.

13. A high security shield as claimed in claim 8 wherein:
    there is further included an opening for a coin release mechanism to project therethrough.

14. A high security shield as claimed in claim 13 wherein:
    there is secured to said face plate behind said coin release mechanism openings a washer including a plurality of stops to restrict the travel of said coin release mechanism.

15. A high security shield as claimed in claim 8 wherein:
    there is further included an opening adapted to permit the projection of a hookswitch from said telephone paystation upper housing.

16. A high security shield as claimed in claim 15 wherein:
    said opening for said hookswitch further is adapted to provide space for a handset support from said paystation upper housing to project therethrough.

17. A high security shield as claimed in claim 1 wherein:
    there is further included at least one spacer positioned between said shield face plate and said telephone paystation upper housing.

* * * * *